United States Patent
Hrescak et al.

(10) Patent No.: US 10,423,394 B2
(45) Date of Patent: Sep. 24, 2019

(54) SYSTEMS AND METHODS FOR MOBILE APPLICATION PROTOTYPING USING LOOPS

(71) Applicant: Facebook, Inc., Menlo Park, CA (US)

(72) Inventors: Matej Hrescak, Palo Alto, CA (US); Andrew Koehler Pouliot, San Francisco, CA (US); Robert Wood, Belmont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/275,145

(22) Filed: Sep. 23, 2016

(65) Prior Publication Data

US 2017/0293476 A1   Oct. 12, 2017

Related U.S. Application Data

(60) Provisional application No. 62/321,142, filed on Apr. 11, 2016.

(51) Int. Cl.
*G06F 9/44* (2018.01)
*G06F 8/38* (2018.01)
*G06F 11/36* (2006.01)

(52) U.S. Cl.
CPC ............ *G06F 8/38* (2013.01); *G06F 11/3664* (2013.01)

(58) Field of Classification Search
None
See application file for complete search history.

(56) References Cited

U.S. PATENT DOCUMENTS

| 7,937,665 | B1* | 5/2011 | Vazquez | G05B 19/0426 |
| | | | | 715/763 |
| 7,987,443 | B2* | 7/2011 | Sawyer | G06F 9/4443 |
| | | | | 717/100 |
| 9,652,739 | B2* | 5/2017 | Siegal | G06Q 10/10 |
| 2005/0149909 | A1* | 7/2005 | Batcha | G06F 8/38 |
| | | | | 717/113 |
| 2006/0041877 | A1* | 2/2006 | Harsh | G06F 9/451 |
| | | | | 717/162 |
| 2006/0230379 | A1* | 10/2006 | Pintos | G06F 8/38 |
| | | | | 717/109 |
| 2007/0240131 | A1* | 10/2007 | Sumerlin, Jr. | G06F 8/20 |
| | | | | 717/139 |
| 2010/0088611 | A1* | 4/2010 | Siegal | G06Q 10/10 |
| | | | | 715/744 |

(Continued)

OTHER PUBLICATIONS

Premaratne, "UI Prototyping with Quartz Composer and Origami," Mar. 15, 2014.*

*Primary Examiner* — Insun Kang
(74) *Attorney, Agent, or Firm* — Sheppard Mullin Richter & Hampton LLP

(57) ABSTRACT

Systems, methods, and non-transitory computer-readable media can create a loop-enabled patch in a node-based computing environment graphical user interface, the loop-enabled patch comprising a first input field and a second input field. A plurality of first input values are received at the first input field, and a plurality of second input values are received at the second input field. A computing system iterates through the plurality of first input values and the plurality of second input values to automatically create a plurality of object instances based on the plurality of first input values and the plurality of second input values.

12 Claims, 11 Drawing Sheets

(56) References Cited

U.S. PATENT DOCUMENTS

| | | | |
|---|---|---|---|
| 2010/0138778 A1* | 6/2010 | Dewan | G06F 9/451 715/789 |
| 2014/0013217 A1* | 1/2014 | Hashii | G06F 17/212 715/253 |
| 2014/0282379 A1* | 9/2014 | Bijani | G06F 8/38 717/109 |
| 2015/0089469 A1* | 3/2015 | Shakespeare | G06F 8/36 717/106 |
| 2016/0098250 A1* | 4/2016 | Gross | G06F 8/20 717/109 |
| 2016/0188183 A1* | 6/2016 | Soffer | G06F 8/38 715/762 |
| 2017/0046235 A1* | 2/2017 | Straub | G06F 11/1474 |
| 2017/0220587 A1* | 8/2017 | Srinivasan | G06F 17/3071 |

* cited by examiner

SYSTEMS AND METHODS FOR MOBILE APPLICATION PROTOTYPING USING LOOPS

CROSS-REFERENCE TO RELATED APPLICATIONS

The present application claims priority to U.S. Provisional Application No. 62/321,142, filed on Apr. 11, 2016, the entire contents of which are incorporated by reference as if fully set forth herein.

FIELD OF THE INVENTION

The present technology relates to mobile application development. More particularly, the present technology relates to tools for creating and prototyping mobile application user interfaces.

BACKGROUND

Advances in computing technology have allowed product developers to fit more computing power into compact, mobile devices. Mobile devices available today, such as smartphones and tablets, allow users to take computing devices with them wherever they go. As mobile devices have grown in popularity and use, mobile applications have grown in popularity and use as well. Demand for new mobile applications continues to grow, making it important for mobile application developers to have tools to efficiently and effectively design mobile applications.

A key aspect of mobile application development is the development of the user interface of the application, including defining the various elements of the user interface, possible interactions with the user interface, and how the interactions affect various elements of the user interface. A user interface can include many different types of interactions to allow the user to perform various tasks within the mobile application. Before release of a mobile application, it is important for a mobile developer to be able to test the mobile application user interface to ensure that the various interactions operate as expected.

SUMMARY

Various embodiments of the present disclosure can include systems, methods, and non-transitory computer readable media configured to create a loop-enabled patch in a node-based computing environment graphical user interface, the loop-enabled patch comprising a first input field and a second input field. A plurality of first input values are received at the first input field, and a plurality of second input values are received at the second input field. A computing system iterates through the plurality of first input values and the plurality of second input values to automatically create a plurality of object instances based on the plurality of first input values and the plurality of second input values.

In an embodiment, each of the plurality of object instances is created based on an input value of the plurality of first input values, and an input value of the plurality of second input values.

In an embodiment, the number of object instances is equal to the number of first input values and the number of second input values.

In an embodiment, the plurality of first input values is received via a first input array, and the plurality of second input values is received via a second input array.

In an embodiment, each object instance of the plurality of object instances comprises object logic defining the operation of the object instance.

In an embodiment, the object logic defines at least one user interaction on a mobile application.

In an embodiment, a loop builder patch is created, the loop builder patch comprising a first output field configured to output a plurality of first output values.

In an embodiment, the loop builder patch further comprises a second output field configured to output a plurality of second output values, and the plurality of second output values comprise a plurality of index values for the plurality of first output values.

In an embodiment, a plurality of data files are received in the node-based computing environment graphical user interface, and the creating the loop builder patch is performed in response to the receiving the plurality of data files.

In an embodiment, a mobile application prototype is executed based on the plurality of object instances.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
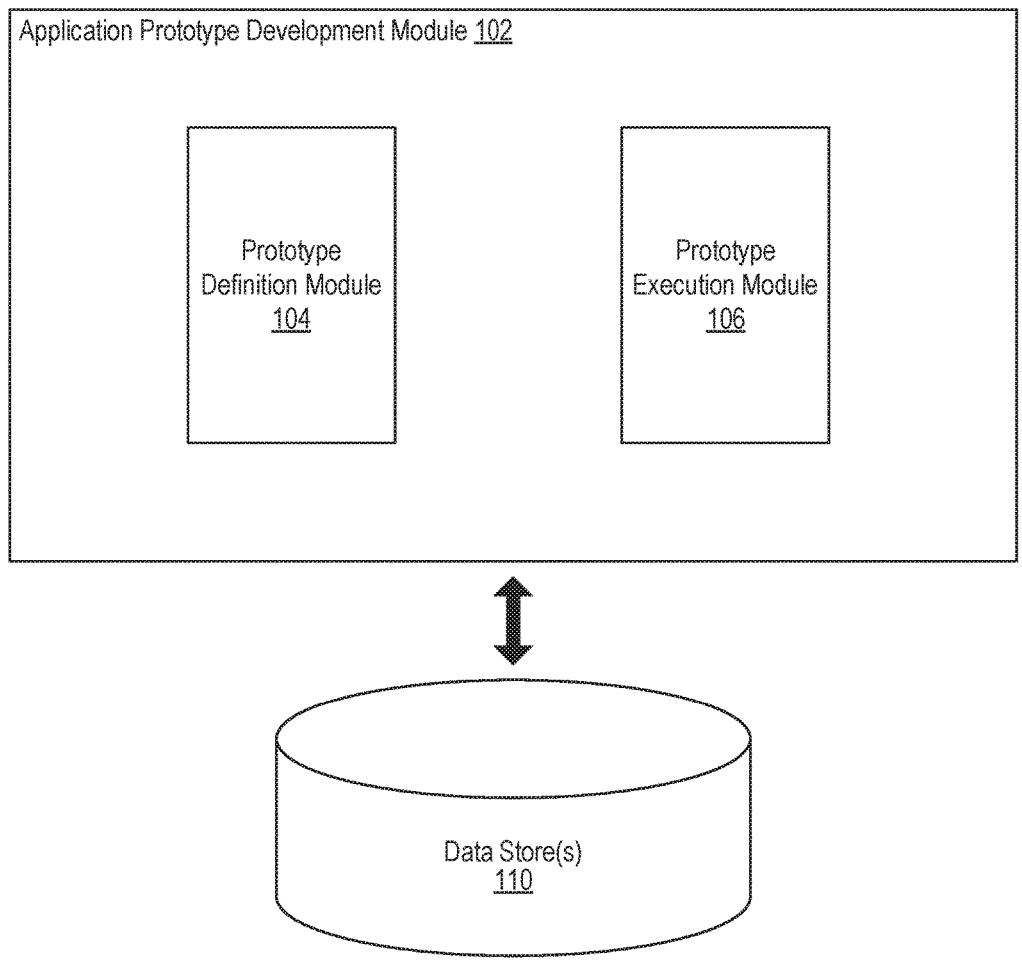
FIG. 1 illustrates an example system including an application prototype development module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Mobile Application Prototyping Using Loops

Advances in computing technology have allowed product developers to fit more computing power into compact, mobile devices. Mobile devices available today, such as smartphones and tablets, allow users to take computing devices with them wherever they go. As mobile devices have grown in popularity and use, mobile applications have grown in popularity and use as well. Demand for new mobile applications continues to grow, making it important for mobile application developers to have tools to efficiently and effectively design mobile applications.

A key aspect of mobile application development is the development of the user interface of the application, including defining the various elements of the user interface, possible interactions with the user interface, and how the interactions affect various elements of the user interface. A user interface can include many different types of interactions to allow the user to perform various tasks within the mobile application. Before release of a mobile application, it is important for a mobile developer to be able to test the mobile application user interface to ensure that the various interactions operate as expected.

In order to meet the growing demand for new mobile applications, it continues to be an important interest to provide mobile application developers with tools to effectively design and test mobile applications. However, it can be difficult providing design tools that are intuitive, efficient, and effective. Many current mobile application design tools require tedious repetition of object definitions and logic, which can lead to large expenditures of time and effort for mobile application developers to create even basic or routine user interfaces.

An improved approach rooted in computer technology overcomes the foregoing and other disadvantages associated with conventional approaches specifically arising in the realm of computer technology. Based on computer technology, the disclosed technology can provide users, such as mobile application developers, with a node-based coding environment and interface to create applications for mobile devices. The node-based coding environment and interface is advantageous at least for the reason that it is intuitive and familiar to many users. In some embodiments, a user creates an instance or version (e.g., a prototype) of an application by placing and connecting various nodes, or "patches." Users can be provided with or define various types of patches, including layer patches, interaction patches, animation patches, transition patches, and loop-builder patches. Loop-builder patches can be utilized to easily and efficiently create multiple instances of objects to be placed in the mobile application user interface. Once the application prototype has been defined in the node-based computing environment, the prototype can be executed and/or simulated to test performance. As will be made clear by the following disclosure, many variations and embodiments are possible.

FIG. 1 illustrates an example system 100 including an example application prototype development module 102 configured to define and execute mobile application prototypes, according to an embodiment of the present disclosure. The application prototype development module 102 can be configured to provide a user with a node-based computing environment and an associated interface to define a mobile application prototype. In various embodiments, the mobile application prototype is defined by placing and connecting various patches using the interface of the node-based computing environment. The various patches are defined using one or more input and output fields, and connected together in various ways to define a mobile application prototype. During prototype definition and/or upon completion of prototype definition, the mobile application prototype can be executed and/or simulated to test that it operates as expected.

As shown in the example of FIG. 1, the application prototype development module 102 can include a prototype definition module 104 and a prototype execution module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

The prototype definition module 104 can be configured to provide a user with a node-based computing environment interface including tools to define a mobile application prototype. In various embodiments, the prototype definition module 104 is configured to provide a user with a node-based computing environment interface to define prototypes using the node-based computing environment. The user places various nodes, or "patches," using the node-based computing environment interface, and connects them together to define the mobile application prototype. For example, the various types of patches can include layer patches, interaction patches, animation patches, transition patches, loop-builder patches, object patches, and the like. Each patch includes one or more input fields and/or one or more output fields. Inputs and outputs of various patches can be connected together to define the mobile application prototype. The prototype definition module 104 is discussed in greater detail herein.

The prototype execution module 106 can be configured to execute, or simulate, a mobile application prototype that has been defined in the node-based computing environment. The prototype execution module 106 is provided with graphical data corresponding to a graphical output resulting from executing the application prototype, and user interaction data corresponding to user interaction with the graphical output. The prototype execution module 106 can be configured to update the graphical output based on user interaction.

In certain embodiments, the graphical output can be displayed on an actual mobile device, and the user interaction data can be received via the mobile device. For example, if the mobile device has a touch screen, user interaction data may be received based on user interaction with the touch screen, such as a tap or a swipe by the user on the touch screen. The graphical output is then updated based on the user's interaction with the mobile device.

In various embodiments, the graphical output can be simulated on the same computing device used to implement the node-based computing environment. For example, if the node-based computing environment is implemented on a laptop or desktop computer, a simulated view of a mobile device can be presented on the laptop or desktop computer. A user can simulate user interaction with a mobile device using the computing device, for example, using a mouse click to emulate a tap on a mobile device touch screen, or clicking and dragging with the mouse to emulate a swipe on a mobile device touch screen.

The application prototype development module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the application prototype development module 102 can be implemented, in part or in whole, as software running on one or more computing devices or systems, such as on a server computing system or a user (or client) computing system. For example, the application prototype development module 102 or at least a portion thereof can be implemented as or within an application (e.g., app), a program, or an applet, etc., running on a user computing device or a client computing system, such as the user device 710 of FIG. 7. In another example, the application prototype development module 102 or at least a portion thereof can be implemented using one or more computing devices or systems that include one or more servers, such as network servers or cloud servers. In some instances, the application prototype development module 102 can, in part or in whole, be implemented within or configured to operate in conjunction with a social networking system (or service), such as the social networking system 730 of FIG. 7. It should be understood that there can be many variations or other possibilities.

The application prototype development module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 730 of FIG. 7). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the application prototype development module 102. For example, the data store 110 can store various application prototype data files, various patch or object definitions, mobile device specifications, and the like. It is contemplated that there can be many variations or other possibilities.

Figure 2:
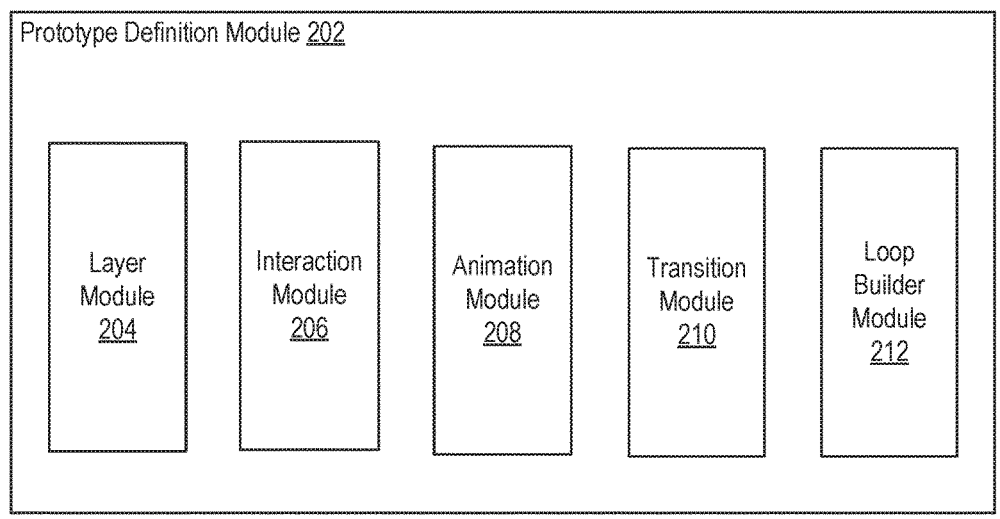
FIG. 2 illustrates an example prototype definition module, according to an embodiment of the present disclosure.

FIG. 2 illustrates an example prototype definition module 202 configured to allow a user to define an application prototype via a node-based computing environment interface, according to an embodiment of the present disclosure. In some embodiments, the prototype definition module 104 of FIG. 1 can be implemented as the example prototype definition module 202. As shown in FIG. 2, the prototype definition module 202 can include a layer module 204, an interaction module 206, an animation module 208, a transition module 210, and a loop builder module 212.

The layer module 204 can be configured to define one or more layer patches to be used in the node-based computing environment. A patch is an element in the node-based computing environment. Each patch includes one or more inputs and/or one or more outputs. Patches may be associated with one another by coupling (e.g., linking) an output of one patch to an input of another patch. Layer patches define the virtual layers on which images of a mobile application graphical user interface are displayed. For example, layer patches can include a "fill layer" which is a layer that occupies the whole area of the mobile application graphical user interface with a specified color having a specified opacity. In another example, layer patches can also include one or more images to be displayed in the mobile application graphical user interface. A layer patch can define various display parameters, such as x position, y position, z position, layer ranking, image opacity, image rotation, image height and width, and the like.

The interaction module 206 can be configured to define one or more interaction patches to be used in the node-based computing environment. Interaction patches define one or more interactions that may be performed by a user with respect to the graphical output of the mobile application prototype. For example, interaction patches can define various input types (e.g., a tap, vertical swipe, horizontal swipe, etc.). Interaction patches can be coupled to one or more other patches to define the effect that various user interactions have on the graphical output of the mobile application prototype.

The animation module 208 can be configured to define one or more animation patches to be used in the node-based computing environment. Animation patches define one or more animations that may be utilized in the graphical output of the mobile application prototype. For example, animations can include scrolling of images, bouncing of images, re-sizing of images, and the like.

The transition module 210 can be configured to define one or more transition patches to be used in the node-based computing environment. Transition patches can be coupled to other patches to define a transition from one state to another. For example, a transition patch can be connected to an interaction patch and a layer patch, to transition the graphical output provided by the layer patch from one state to another based on user interaction. For example, if the transition patch is connected to an interaction patch that defines a horizontal swipe by a user, and the opacity field of a fill layer, the transition patch can be configured such that as the user swipes horizontally, the opacity of the fill layer changes.

The loop builder module 212 can be configured to define one or more loop-builder patches to be used in the node-based computing environment. Loop-builder patches can be used to create multiple instances of objects efficiently. Loop-builder patches can receive as inputs multiple values for each input field, and can iteratively create multiple objects using those multiple values. Loop-builder patches receive multiple values as if they were a single value, and loops through the multiple values and assigns each of the multiple values to a unique instance of an object to automatically create multiple instances of objects based on the multiple values.

Layer patches, interaction patches, animation patches, transition patches, loop-builder patches, and other examples of patches are discussed in greater detail herein with respect to various examples described below.

Figure 3A:
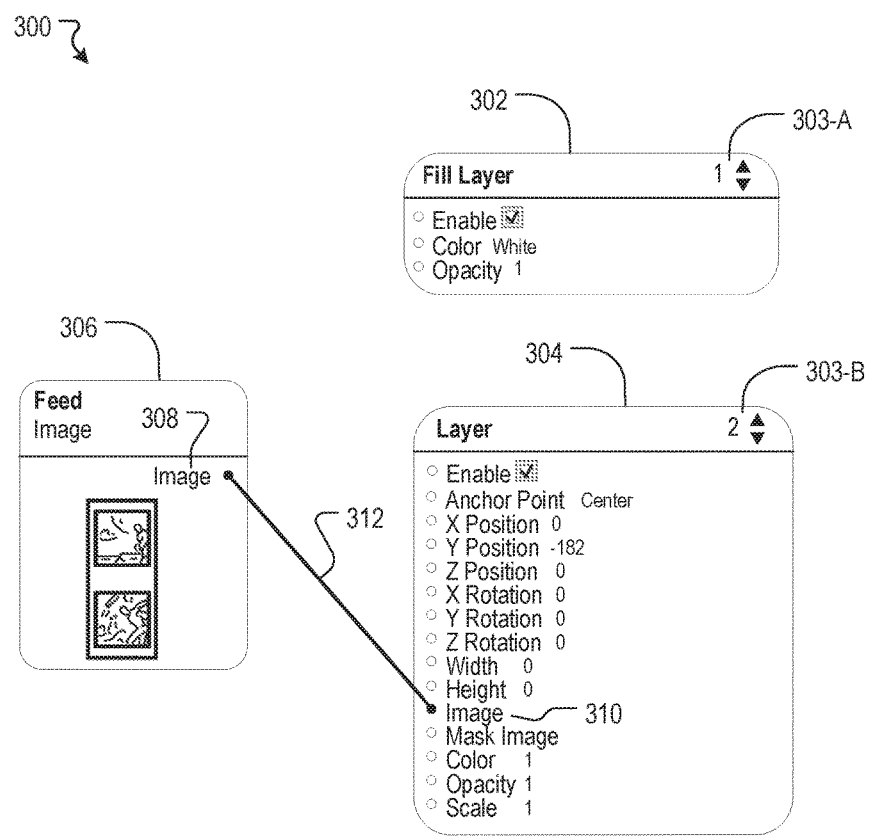
FIG. 3A illustrates an example scenario including an exemplary application prototype definition, according to an embodiment of the present disclosure.

FIG. 3A illustrates an example scenario including an example application prototype definition 300 as displayed in a node-based computing environment graphical user interface. The example application prototype definition 300 includes a layer patch 302, a second layer patch 304, and an image patch 306. As discussed briefly above, layer patches 302 and 304 define the virtual layers on which images of the mobile application prototype are displayed. Layer patch 302 is an example of a particular type of layer patch-a "fill layer" patch. In some embodiments, the fill layer is a layer that occupies the whole area of the mobile application prototype's graphical user interface. Layer patch 304 is an example of a general layer patch, and includes various inputs for defining various display parameters (e.g., x position, y position, z position, x-y-z rotation, width, height, image, color, opacity, scale, etc.). A fill layer is a specific case of a general layer patch, and may be defined using a general layer patch rather than the specific "fill layer" patch shown in FIG. 3A.

In certain embodiments, each layer in the definition 300 is assigned a layer order, or layer ranking. Images associated with a layer higher in the layer order are superimposed over images lower in the layer order. For example, in definition 300, layers 302 and 304 are assigned respective layer positions 303-A and 303-B. Based on the positions, the image associated with layer patch 304 is superimposed over the fill layer patch 302.

The definition 300 also includes an image patch 306. The image patch 306 is an example of an object patch, that can be used as inputs to other patches. For example, an object patch can include an image file, or a video file, or an audio file, that can be used as inputs to other patches, e.g., as an input to a layer patch to display the image or video. The image patch 306 specifies an image that is to be displayed in the layer patch 304. For example, the image patch 306 can be defined by an image file (e.g., a .jpg or .png file). In this example, the image patch 306 is named "Feed" and corresponds to a content feed view of a social networking system application. The image patch 306 is connected to the layer patch 304 by a line 312 coupling the "Image" output 308 of the image patch 306 with the "Image" input 310 of the layer patch 304. The layer patch 304 takes as its associated image the image of the image patch 306.

Figure 3B:
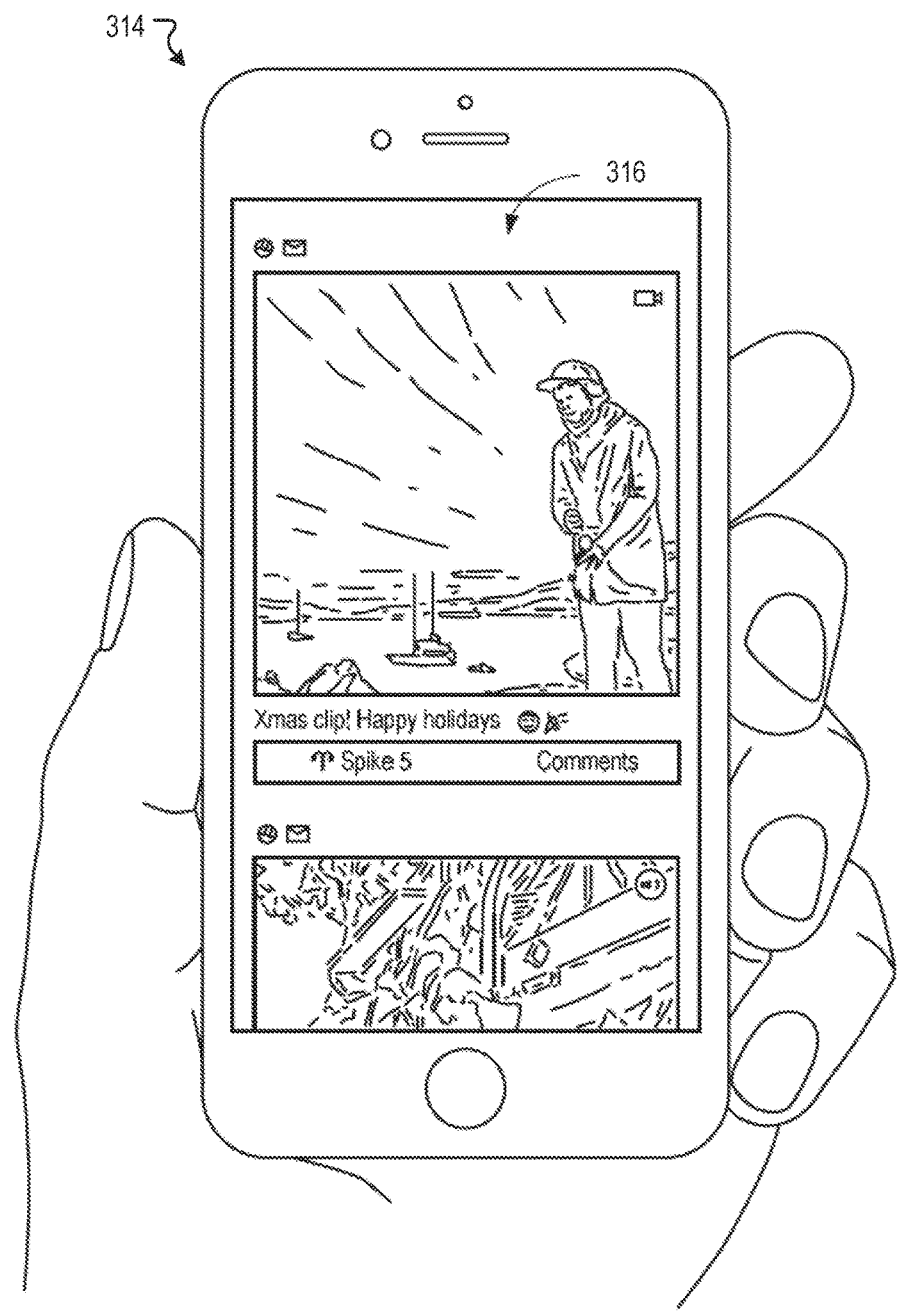
FIG. 3B illustrates an example scenario including an exemplary application prototype user interface based on the exemplary application prototype definition of FIG. 3A.

FIG. 3B illustrates an example graphical output 314 when the application prototype corresponding to definition 300 is executed. The graphical output 314 can be displayed on an actual mobile device, or can be displayed on a computing device (e.g., a laptop or desktop computer) simulating a mobile device's display. When the application prototype corresponding to definition 300 is executed, the image corresponding to the layer patch 304 (and the image patch 306) is displayed on top of the image corresponding to fill layer patch 302, i.e., a solid, colored fill layer. The image 316 shown in FIG. 3B is based on the image patch 306 connected to the layer patch 304. A white fill layer, corresponding to the fill layer patch 302, fills the space behind the image, but is covered entirely by the image in this example due to the layer ranking of the layer patches 302 and 304.

Figure 4A:
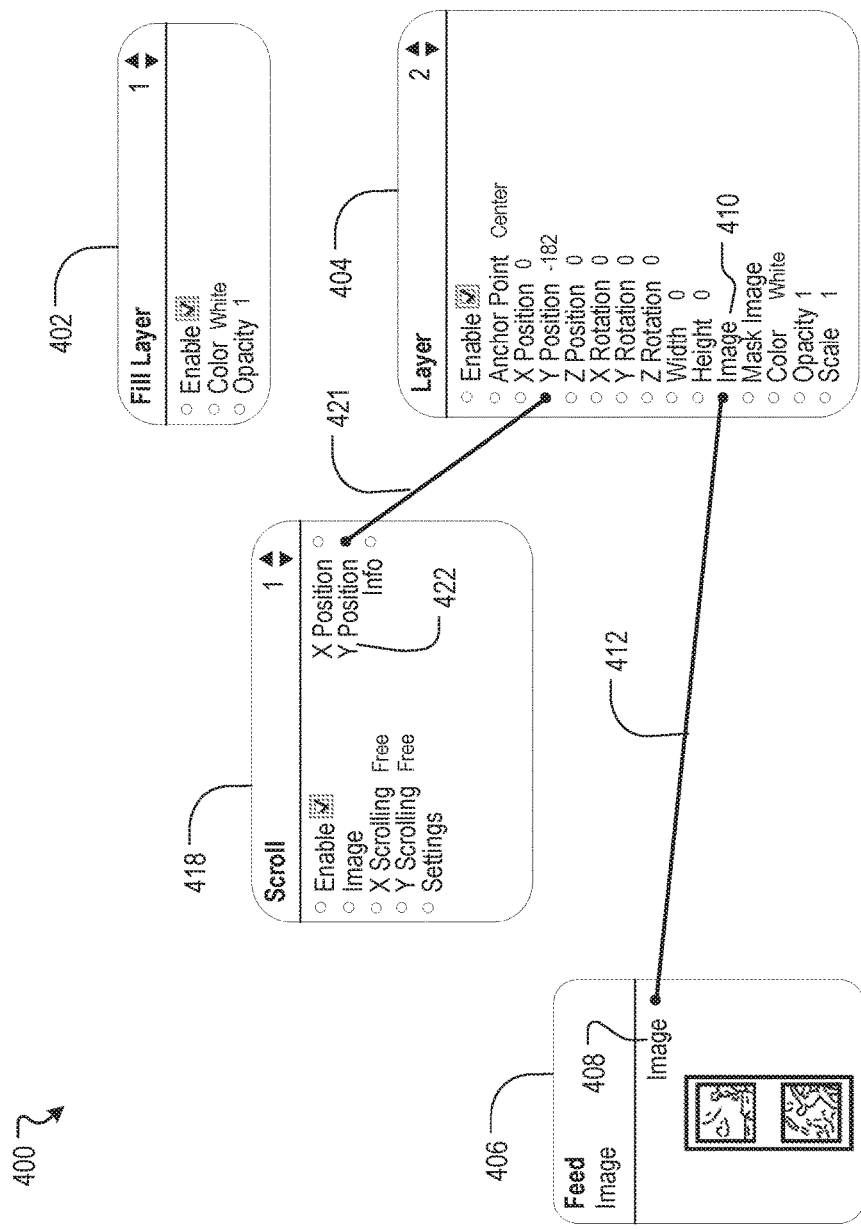
FIG. 4A illustrates an example scenario including an exemplary application prototype definition demonstrating a scroll interaction, according to an embodiment of the present disclosure.

FIG. 4A illustrates an example scenario including an example application prototype definition 400. The definition 400 is very similar to the definition 300 of FIG. 3A, and includes a fill layer patch 402, a layer patch 404, and an image patch 406, but also adds a "scroll" animation patch 418. The scroll animation patch 418 defines an animation, in this case a scrolling animation. The animation patch 418 effectuates a "scroll" animation by varying the "Y Position" value of the layer patch 404. The scroll animation patch 418 outputs a "Y Position" value 422, which is coupled by a line 421 to a "Y Position" input for the layer patch 404. The scroll animation patch 418 can be configured, for example, to output a first Y Position value, and then continue to increase the Y Position output value. By varying the Y Position from a low value, corresponding to a lower position in the graphical user interface, to a high value, corresponding to a higher position in the graphical user interface, the scroll animation patch 418 can cause the layer patch 404 to scroll an image associated with an "Image" output 408 of the image patch 406 and connected to an "Image" input 410 of the layer patch 404 by a line 412. In this example, the image is scrolled from the bottom of the user interface to the top of the user interface.

Figure 4B:
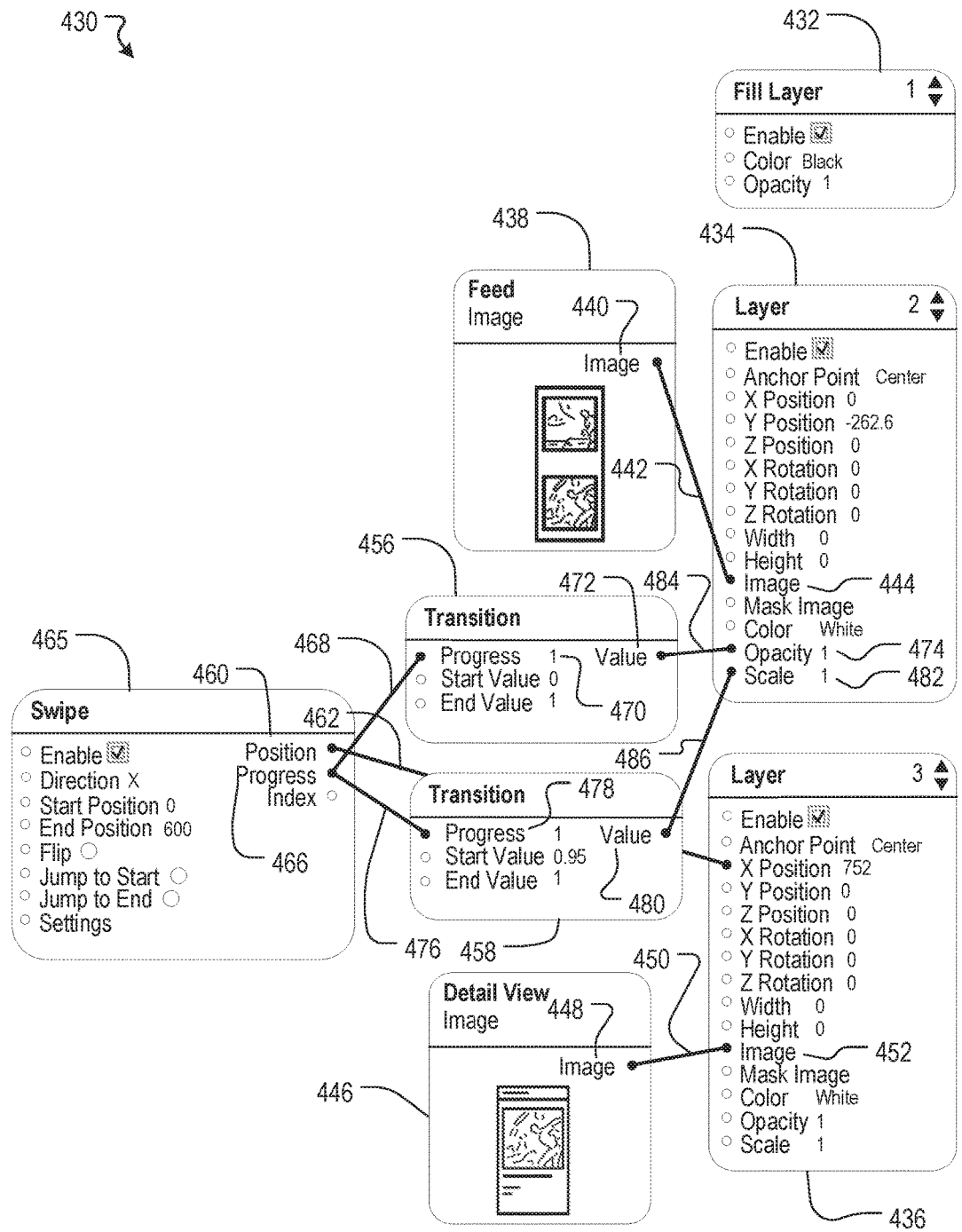
FIG. 4B illustrates an example scenario including an exemplary application prototype definition demonstrating a swipe interaction, according to an embodiment of the present disclosure.

FIG. 4B illustrates an example scenario including an example application prototype definition 430. Definition 430 includes a fill layer patch 432, and two layer patches 434 and 436. An image patch 438 is associated with the layer patch 434 by coupling an image output 440 of the image patch 438 to an image input 444 of the layer patch 434 via a line 442. A second image patch 446 is associated with the layer patch 436 by coupling an image output 448 of the second image patch 446 to an image input 452 of the layer patch 436 via a line 450.

Definition 430 also includes transition patches 456 and 458 and an interaction patch 465. The interaction patch 465 defines an interaction (e.g., a gesture) that may be performed by the user with respect to the graphical output of the application prototype. As shown in FIG. 4B, the interaction patch 465, named "Swipe," defines a swipe gesture interaction.

In some embodiments, an interaction patch outputs values based on user interaction with a mobile device, and the output values may be used as inputs for other patches. For example, the interaction patch 465 has, among a plurality of outputs, a "Position" output 460 and a "Progress" output 466. The position output 460 supplies a value corresponding to a position on the display area based on the swipe gesture interaction. The progress output 466 supplies a value for controlling progression of a transition based on the progression of the swipe gesture interaction. The position output 460 is coupled to the "X Position" input 464 of the layer patch 436 by a line 462; the x-coordinate value for images associated with the layer patch 436 changes with a swipe gesture interaction in accordance with the swipe patch 465. The progress output 466 is coupled to "Progress" inputs 470 and 478 of transition patches 456 and 458, respectively, by lines 468 and 476, respectively.

In some embodiments, a transition patch (e.g., transition patches 456 and 458) defines a starting value and an end value for a transition effect, and receives as input values a progress output of an interaction patch. The progress output of an interaction patch supplies a progress value for controlling the progression of a transition based on the progression of an interaction (e.g., gesture). The transition patch outputs a value that may be used as the input for a display parameter of a layer patch 436 that varies on a value scale. For example, in FIG. 4B, value output 472 of transition patch 456 is coupled to opacity input 474 of layer patch 434 by line 484, and value output 480 of transition patch 458 is coupled to scale input 482 of layer patch 434 by line 486. With the coupling of the swipe patch 465 to opacity input 474 and scale input 482 of layer patch 434 via transition patches 456 and 458, respectively, the opacity and scale of images associated with the layer patch 434 transitions with a swipe gesture interaction in accordance with the swipe patch 465.

Figure 5A:
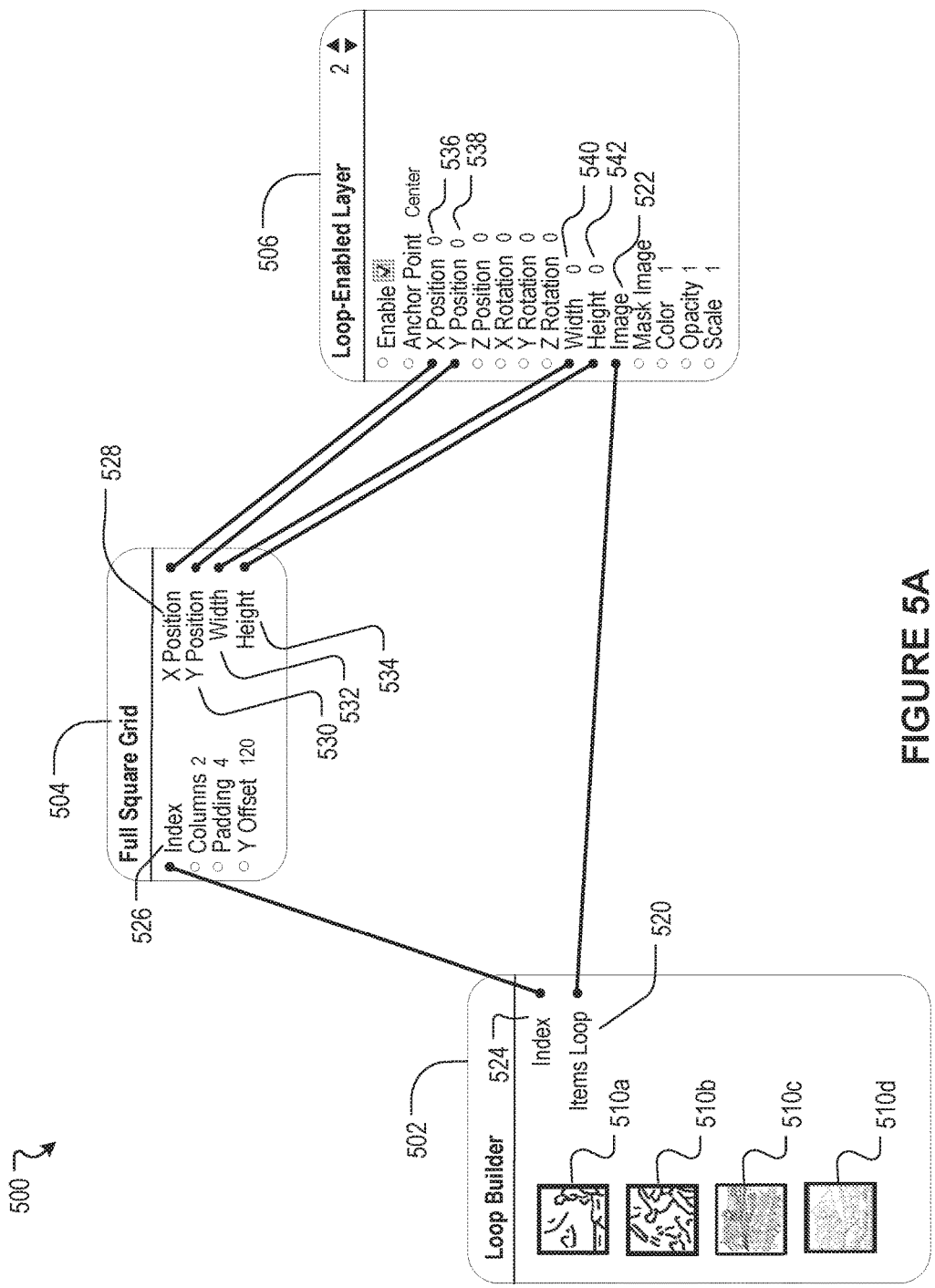
FIG. 5A illustrates an example scenario, including an exemplary application prototype definition demonstrating loop-enabled application definition, according to an embodiment of the present disclosure.

FIG. 5A illustrates an example scenario including an example application prototype definition 500. The definition 500 includes a loop builder patch 502, a customized "full square grid" patch 504, and a loop-enabled layer patch 506. The definition 500 is configured to receive a plurality of image files (via the loop builder patch 502), and display the plurality of images in a grid. The definition 500 is configured to perform this task using a "looping" functionality which allows a user to input and/or output multiple values to and/or from patches as if they are a single value, and have the node-based computing environment iterate on the multiple values to create multiple instances of various objects.

In the definition 500, the loop builder patch 502 contains four different images 510a-d. In certain embodiments, if a user drags a plurality of files into the node-based computing environment interface, a loop builder patch is automatically created based on the plurality of files. For example, in this case, if a user dragged a folder containing four image files into the node-based computing environment interface, a loop builder patch could automatically be created containing the four image files. The loop builder patch 502 behaves similarly to an image patch, but instead of outputting a single image, the loop builder patch 502 outputs four different images via an items loop output 520 of the loop builder patch 502. This may be accomplished, for example, using an array structure, with the array structure comprising the four images 510a-d. The term "loop-enabled patch" as used herein, references any patch that is capable of receiving a plurality of inputs for a given input field and/or outputting a plurality of output values for a given output field. In the definition 500, each of the patches 502, 504, and 506 are loop-enabled patches.

The items loop output 520 of the loop builder patch 502 is connected to an image input 522 of the loop-enabled layer patch 506. As was discussed previously, a layer patch can receive as an input an image to be displayed. The loop-enabled layer patch 506 is able to receive a plurality of images, e.g., an array of images, via the image input 522. The loop-enabled layer patch 506 is configured to iterate through the plurality of images to create a unique image instance for each image. In other words, the loop-enabled layer patch 506 essentially operates as if it is four different layer patches with each layer patch containing a respective one of the four images 510a-510d. Each image instance, in addition to being associated with a respective one of the four images 510a-510 d, can have further unique properties based on the other inputs to the loop-enabled layer patch 506, which is discussed in greater detail.

The loop builder patch 502 also outputs index values associated with each of the images 510a-d from an index output 524. For example, image 510a can be associated with an index value of "1," image 510b associated with an index value of "2," and so forth. The index output 524 of the loop builder patch 502 is connected to an index input 526 of the full square grid patch 504. The full square grid patch 504 is configured to calculate various image properties for the loop-enabled layer patch 506 based on its various input parameters, i.e., a plurality of index values, a number of columns, a padding width, and a y offset value. The full square grid 504 utilizes these inputs to calculate a plurality of x positions, a plurality of y positions, a plurality of widths, and a plurality of heights, one of each value for each image 510a-d, so that the images 510a-d contained in the loop builder can be displayed in a grid formation.

For example, in FIG. 5A, the full square grid patch 504 can be configured to determine that there are four images based on the index values received at the index input 526 (e.g., 1, 2, 3, 4). The full square grid patch 504 can calculate an appropriate x position for each of the four images 510a-510d based on the number of columns, and the padding, and output a plurality of x position values via an x position output 528, each x position value associated with a respective one of the four images 510a-510d. Similarly, the full square grid patch 504 can calculate an appropriate y position for each of the four images 510a-510d, and output the four y position values to the loop-enabled layer patch 506 via a y-position output 530. Similarly, the full square grid patch 504 can calculate and output four width values at a width output 532, and four height values at a height output 534 to the loop-enabled layer patch 506. The loop-enabled layer patch 506, receiving four x position values at an x position input 536, four y position values at a y position input 538, four width values at a width input 540, four height values at a height input 542, and four images at the image input 522, can create four image instances, equivalent to four different layer patches, using the correct x position, y position, width, and height values for each image. Rather than receiving four values for each input value, it is possible that the loop-enabled layer patch 506 receives just a single value for a given input. For example, if the width of each image is equal, then the width input can be four width values that are all equal, or a single width value that is applied to all image instances created. Any values for which an input is not received can be set to a default value, or a pre-determined value. In essence, loop-enabled layer patch 506 is equivalent to four separate layer patches, each having its own image, x position value, y position value, width, and height. Instead of a user having to create four different layer patches and defining parameters for each one, the user can go through the process just once to automatically create the four different layer patches using multiple inputs and outputs. In certain embodiments, a user can view the plurality of input or output values for a particular field by selecting and/or mousing over a particular input or output field. For example, if a user mouses over the x position output of the full square grid patch 504, the user can see the four x-position values being output by the full square grid patch 504.

Figure 5B:
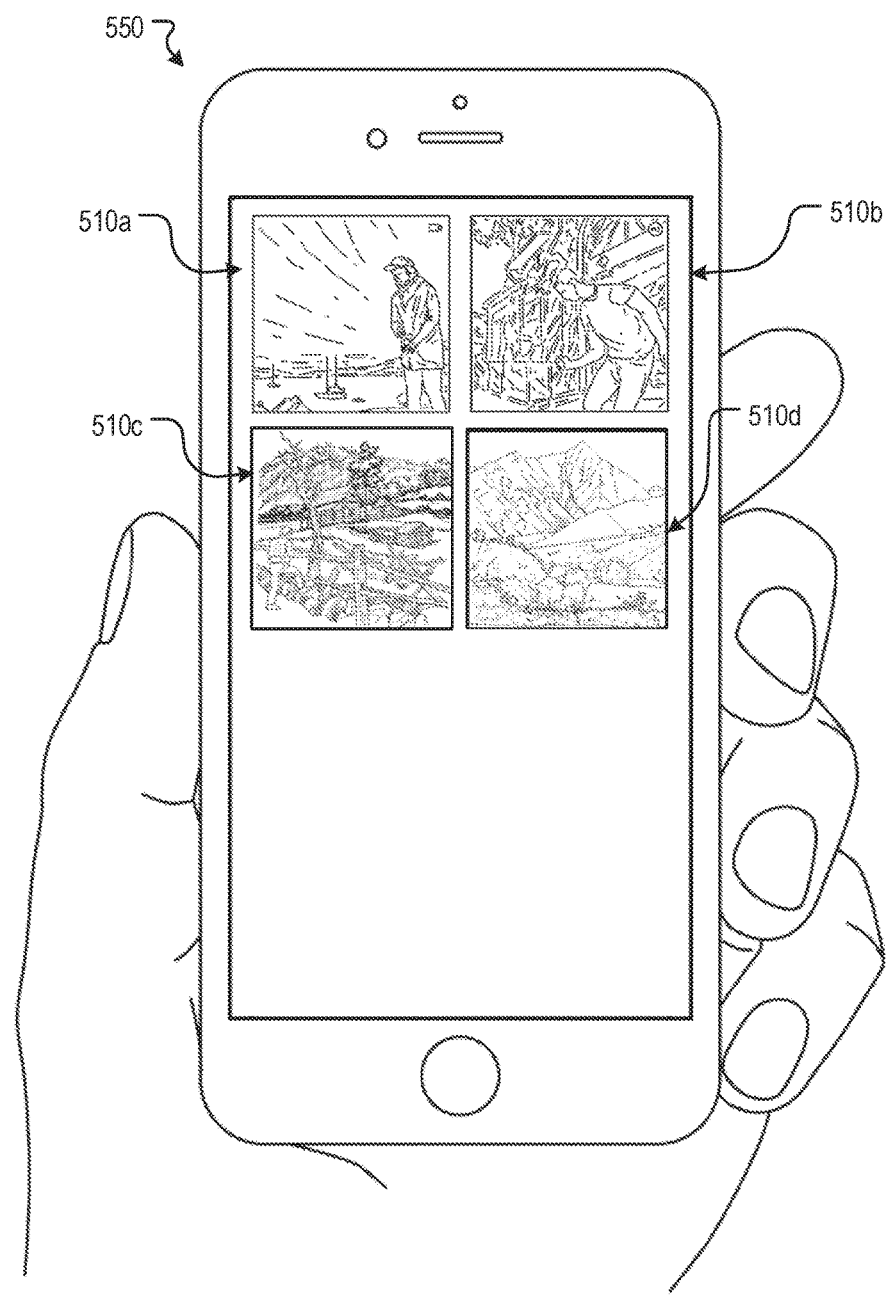
FIG. 5B illustrates an example scenario including an application prototype user interface based on the exemplary application prototype definition of FIG. 5A.

FIG. 5B illustrates an example graphical output 550 when the application prototype corresponding to the definition 500 is executed. The four images 510a-510d are displayed in a square grid format. While the present disclosure provides a simplified example of utilizing the looping functionality to display image files, it should be understood that the looping functionality can be applied to any context in an application prototype which may require multiple instances of elements or objects to be created. Furthermore, any logic associated with a particular element or object can also be duplicated in each instance of the element or object. For example, with reference to FIG. 5A, layer patches include logic to display images on a mobile device (e.g., logic to resize images, logic to place images at a particular position, logic to rotate images, etc.). The loop-enabled layer patch 506 can be configured to duplicate this same logic for each instance (or object instance) of the four different layer patches created by loop-enabled layer patch 506. In another example, if a custom image object has been design to include logic for zooming in when a user taps, or scrolling to a next image when a user swipes horizontally, that previously programmed logic can be repeated for each object instance of custom image objects created using looping. In yet another example, if a user has created a custom "tab" object, which is represented on a mobile device interface by an image, and the tab object includes logic such that a page associated with the tab opens when the tab is selected, the user can create multiple tab object instances by inputting a plurality of tab images, and a plurality of pages.

Figure 6:
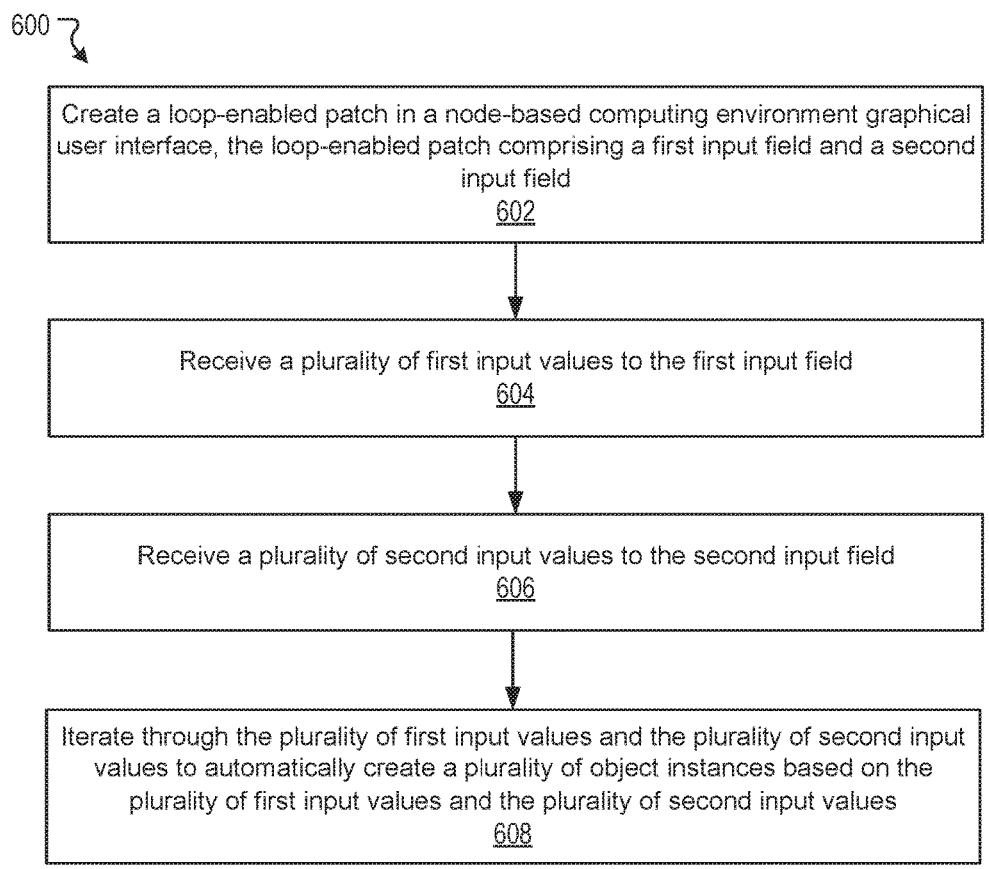
FIG. 6 illustrates an example method for automatically creating a plurality of object instances based on a loop-enabled patched, according to an embodiment of the present disclosure.

FIG. 6 illustrates an example method 600 associated with creating a plurality of object instances based on a loop-enabled patch, according to an embodiment of the present disclosure. It should be appreciated that there can be additional, fewer, or alternative steps performed in similar or alternative orders, or in parallel, based on the various features and embodiments discussed herein unless otherwise stated.

At block 602, the example method 600 can create a loop-enabled patch in a node-based computing environment graphical user interface, the loop-enabled patch comprising a first input field and a second input field. At block 604, the example method 600 can receive a plurality of first input values to the first input field. At block 606, the example method 600 can receive a plurality of second input values to the second input field. At block 608, the example method 600 can iterate through the plurality of first input values and the plurality of second input values to automatically create a plurality of object instances based on the plurality of first input values and the plurality of second input values. Other suitable techniques that incorporate various features and embodiments of the present technology are possible.

Social Networking System—Example Implementation

Figure 7:
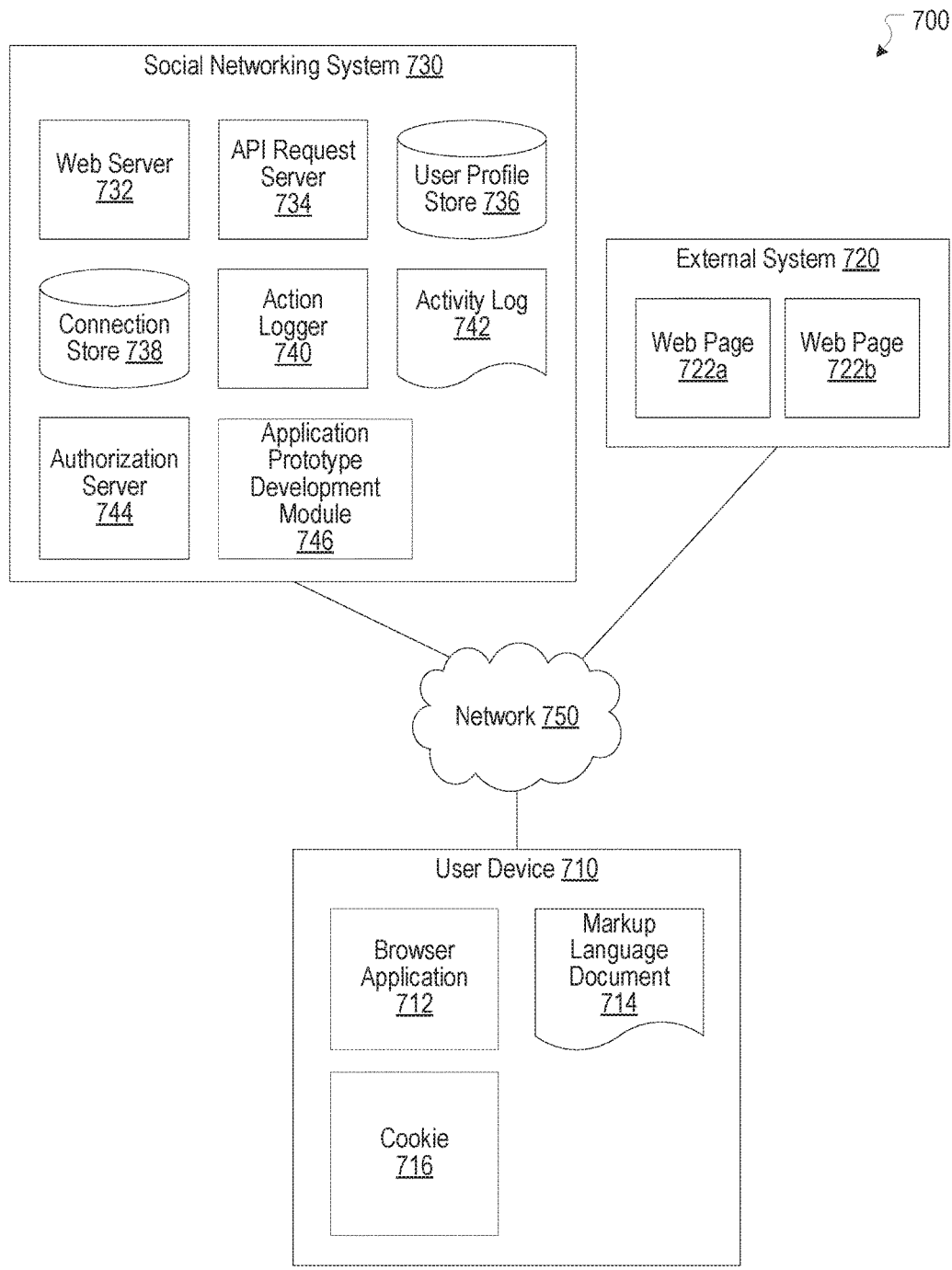
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JAVASCRIPT Object Notation (JSON) data, JSON with padding (JSONP), and JAVASCRIPT data to facilitate data-interchange between the external system 720 and the user device 710. The browser application 712 on the user device 710 may use a JAVASCRIPT compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user may be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This can occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as JAVA, JAVASCRIPT, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include an application prototype development module 746. The application prototype development module 746 can, for example, be implemented as the application prototype development module 102 of FIG. 1. As discussed previously, it should be appreciated that there can be many variations or other possibilities. For example, in some instances, the application prototype development module 746 (or at least a portion thereof) can be included or implemented in the user device 710. Other features of the application prototype development module 746 are discussed herein in connection with the application prototype development module 102.

Hardware Implementation

Figure 8:
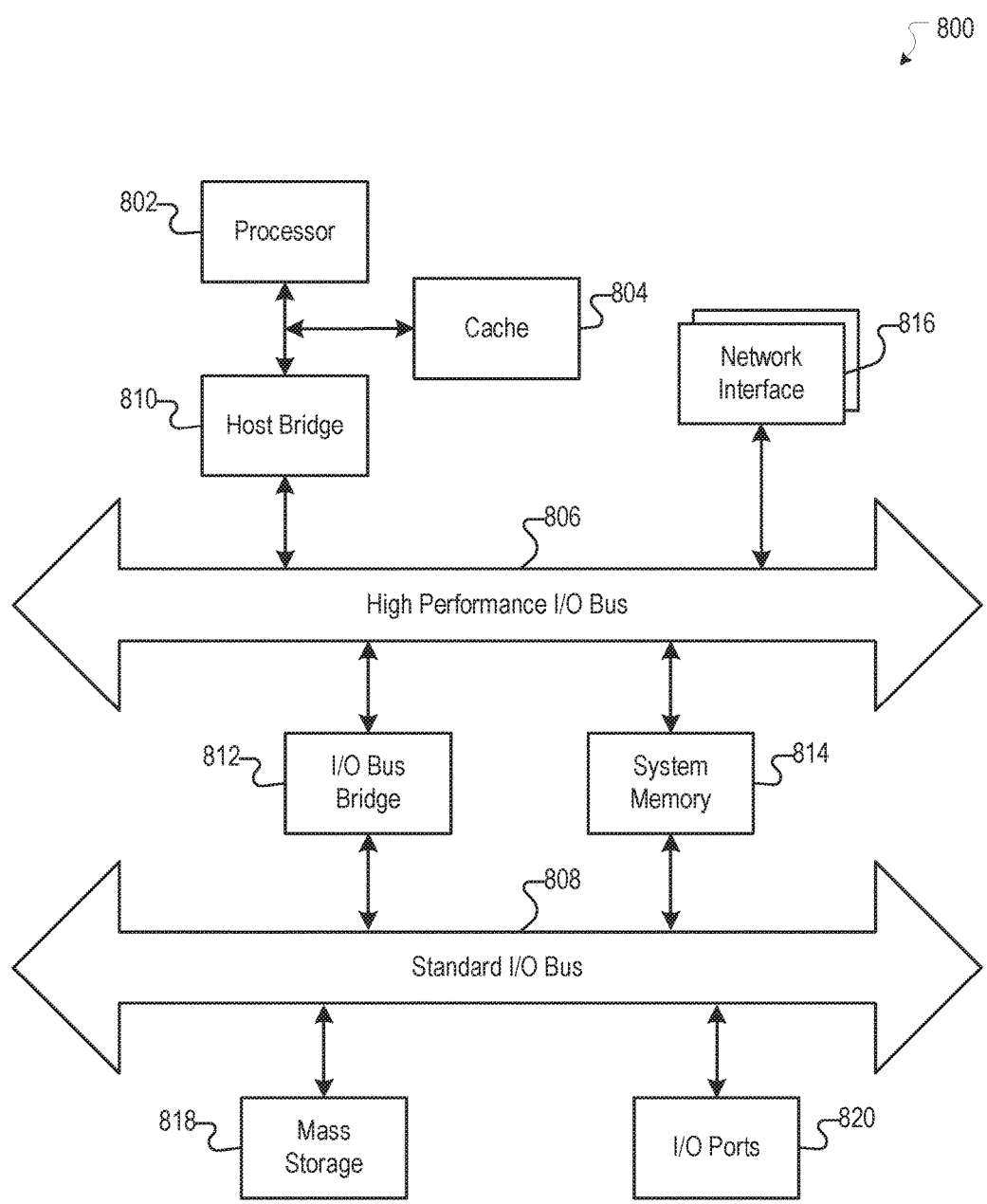
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   creating, by a computing system, a loop-enabled patch of a prototype definition for a mobile application prototype in a node-based computing environment graphical user interface in response to receiving a plurality of data files in the node-based computing environment graphical user interface, the loop-enabled patch comprising a first input field and a second input field, wherein the mobile application prototype is defined by connecting inputs and outputs of various patches;
   receiving, by the computing system, at the first input field, a single input comprising a first input array comprising a plurality of first input values;
   receiving, by the computing system, at the second input field, a single input comprising a second input array comprising a plurality of second input values;
   automatically generating, by the computing system, a plurality of object instances based on the plurality of first input values received as a single input and the plurality of second input values by iterating through the plurality of first input values and the plurality of second input values and assigning each object instance of the plurality of object instances one input value of the plurality of first input values and one input value of the plurality of second input values; and
   executing, by the computing system, the mobile application prototype based on the plurality of object instances.

2. The computer-implemented method of claim 1, wherein the number of object instances is equal to the number of first input values and the number of second input values.

3. The computer-implemented method of claim 1, wherein each object instance of the plurality of object instances comprises object logic defining the operation of the object instance.

4. The computer-implemented method of claim 3, wherein the object logic defines at least one user interaction on a mobile application.

5. The computer-implemented method of claim 1, further comprising:
   creating a loop builder patch comprising a first output field configured to output a plurality of first output values.

6. The computer-implemented method of claim 5, wherein,
   the loop builder patch further comprises a second output field configured to output a plurality of second output values, and
   the plurality of second output values comprise a plurality of index values for the plurality of first output values.

7. A system comprising:
   at least one processor; and
   a memory storing instructions that, when executed by the at least one processor, cause the system to perform a method comprising:
   creating a loop-enabled patch of a prototype definition for a mobile application prototype in a node-based computing environment graphical user interface in response to receiving a plurality of data files in the node-based computing environment graphical user interface, the loop-enabled patch comprising a first input field and a second input field, wherein the mobile application prototype is defined by connecting inputs and outputs of various patches;
   receiving, at the first input field, a single input comprising a first input array comprising a plurality of first input values;
   receiving, at the second input field, a single input comprising a second input array comprising a plurality of second input values;
   automatically generating a plurality of object instances based on the plurality of first input values received as a single input and the plurality of second input values by iterating through the plurality of first input values and the plurality of second input values and assigning each object instance of the plurality of object instances one input value of the plurality of first input values and one input value of the plurality of second input values; and
   executing the mobile application prototype based on the plurality of object instances.

8. The system of claim 7, wherein the number of object instances is equal to the number of first input values and the number of second input values.

9. The system of claim 7, wherein each object instance of the plurality of object instances comprises object logic defining the operation of the object instance.

10. A non-transitory computer-readable storage medium including instructions that, when executed by at least one processor of a computing system, cause the computing system to perform a method comprising:
    creating a loop-enabled patch of a prototype definition for a mobile application prototype in a node-based computing environment graphical user interface in response to receiving a plurality of data files in the node-based computing environment graphical user interface, the loop-enabled patch comprising a first input field and a second input field, wherein the mobile application prototype is defined by connecting inputs and outputs of various patches;
    receiving, at the first input field, a single input comprising a first input array comprising a plurality of first input values;

receiving, at the second input field, a single input comprising a second input array comprising a plurality of second input values;

automatically generating a plurality of object instances based on the plurality of first input values received as a single input and the plurality of second input values by iterating through the plurality of first input values and the plurality of second input values and assigning each object instance of the plurality of object instances one input value of the plurality of first input values and one input value of the plurality of second input values; and executing the mobile application prototype based on the plurality of object instances.

11. The non-transitory computer-readable storage medium of claim 10, wherein the number of object instances is equal to the number of first input values and the number of second input values.

12. The non-transitory computer-readable storage medium of claim 10, wherein each object instance of the plurality of object instances comprises object logic defining the operation of the object instance.

* * * * *